J. C. MILLER.
Fruit Picker.
No. 202,042.   Patented April 2, 1878.
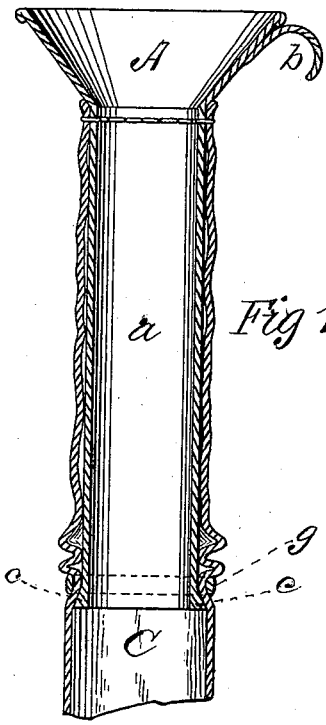
Fig 1.
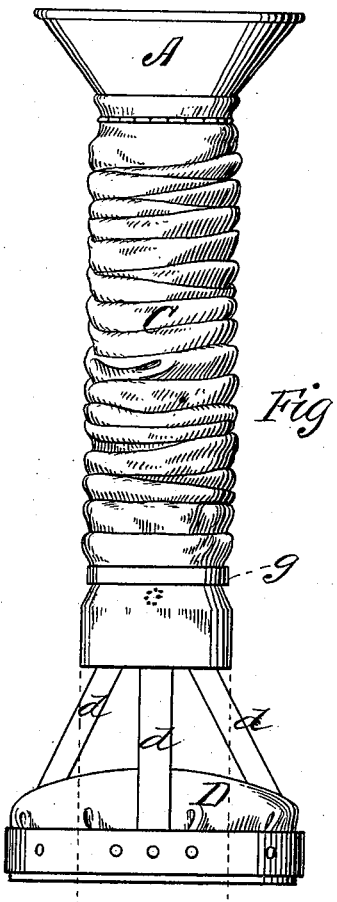
Fig 2.
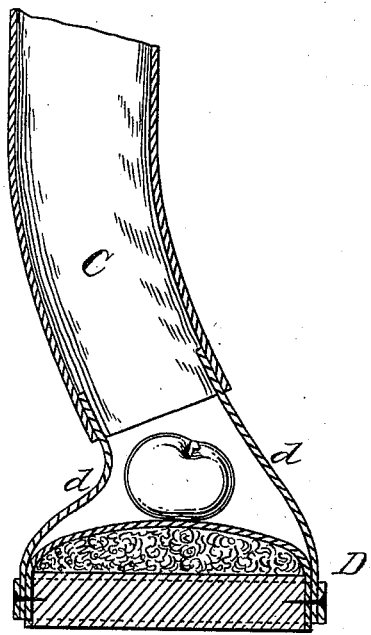
WITNESSES
Villette Anderson.
F. J. Masi.
INVENTOR
John C. Miller,
by E. W. Anderson
ATTORNEY

UNITED STATES PATENT OFFICE.

JOHN C. MILLER, OF BRIDGEWATER, VIRGINIA.

IMPROVEMENT IN FRUIT-PICKERS.

Specification forming part of Letters Patent No. 202,042, dated April 2, 1878; application filed February 23, 1878.

*To all whom it may concern:*

Be it known that I, JOHN C. MILLER, of Bridgewater, in the county of Rockingham and State of Virginia, have invented a new and valuable Improvement in Fruit-Pickers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical central section of my fruit-picker, and Fig. 2 is a side view thereof with the flexible tube sleeved on the funnel-neck.

This invention has relation to improvements in means for carrying fruit to the ground from a tree without bruising it.

The nature of the invention consists in a tube adapted to be suspended from a limb or top rung of a ladder, having on its lower end a soft cushion, upon which the fruit is received and its fall broken, as will be hereinafter more fully set forth.

In the annexed drawings, the letter A designates a metallic funnel of suitable dimensions, provided with a cylindrical neck, $a$, of several inches length usually. Sometimes this neck may be sufficiently long to clear the branches of the tree.

The funnel is provided with a hook, $b$, by means of which it is suspended from a limb or round of a ladder, and the neck, at its lower end, with a flare or projecting flange, $c$, the object of which is hereinafter explained.

C represents a flexible tube, of any suitable material, into one end of which the funnel-neck is inserted. This tube is drawn up over the neck, after the manner of a sleeve, and is secured to it just under the funnel. It is provided at its free end with a soft cushion, D, connected thereto by means of spaced tapes $d$, between which the fruit has free egress.

The funnel being suspended from a tree or ladder, the tube C is let down until the cushion rests upon the ground by relieving it of the pressure of an elastic band, $g$. This being accomplished, the band is released, and, by clamping the tube around the neck, prevents any excess thereof beyond what is requisite from being let off the neck. The apples are then picked, dropped in the funnel, and passed into the tube, going through which they fall upon the cushion, which, being soft and yielding, does not bruise them. The cushion may be set in a basket, barrel, or other receptacle. After being used, the funnel is unhooked from the tree or ladder, the elastic band slipped off the free end of the neck, and run down to the cushion. The tube C is then drawn upon the funnel-neck in folds until its entire length is taken up and the said band passed over the flare or lip aforesaid, by which means the said tube is fastened upon the neck and prevented escaping therefrom.

In this condition the gatherer may be stowed away when not in use in a small space, and may be conveniently carried from place to place.

What I claim as new, and desire to secure by Letters Patent, is—

In a fruit-conveyer, the combination, with the funnel A, having an extended neck portion, $a$, of a flexible folding tube C, adapted to be run up on the neck $a$ in annular folds, and having at its lower end a cushion suspended therefrom by cords or tapes spaced to allow egress to the apples after striking the cushion, substantially as specified.

In testimony that I claim the above I have hereunto subscribed my name in the presence of two witnesses.

JOHN C. MILLER.

Witnesses:
S. F. SANGER,
BENJAMIN MILLER.